United States Patent
Shimazumi

(10) Patent No.: US 9,355,777 B2
(45) Date of Patent: May 31, 2016

(54) SLURRY COMPOSITION, CERAMIC GREEN SHEET, AND MULTI LAYER CERAMIC CAPACITOR

(71) Applicant: KURARAY CO., LTD., Kurashiki-shi (JP)

(72) Inventor: Yuhi Shimazumi, Tokyo (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/348,363

(22) PCT Filed: Sep. 28, 2012

(86) PCT No.: PCT/JP2012/075012
§ 371 (c)(1),
(2) Date: Mar. 28, 2014

(87) PCT Pub. No.: WO2013/047717
PCT Pub. Date: Apr. 4, 2013

(65) Prior Publication Data
US 2014/0256863 A1    Sep. 11, 2014

(30) Foreign Application Priority Data

Sep. 28, 2011 (JP) .................................. 2011-211940

(51) Int. Cl.

| | |
|---|---|
| C08L 29/14 | (2006.01) |
| H01G 4/12 | (2006.01) |
| C04B 35/632 | (2006.01) |
| B32B 18/00 | (2006.01) |
| C04B 35/053 | (2006.01) |
| C04B 35/111 | (2006.01) |
| C04B 35/18 | (2006.01) |
| C04B 35/453 | (2006.01) |
| C04B 35/46 | (2006.01) |
| C04B 35/468 | (2006.01) |
| C04B 35/486 | (2006.01) |
| C04B 35/565 | (2006.01) |
| C04B 35/581 | (2006.01) |
| C04B 35/584 | (2006.01) |
| C04B 35/597 | (2006.01) |
| C04B 35/626 | (2006.01) |
| C08K 5/09 | (2006.01) |

(52) U.S. Cl.
CPC .............. *H01G 4/1209* (2013.01); *B32B 18/00* (2013.01); *C04B 35/053* (2013.01); *C04B 35/111* (2013.01); *C04B 35/18* (2013.01); *C04B 35/453* (2013.01); *C04B 35/46* (2013.01); *C04B 35/4682* (2013.01); *C04B 35/486* (2013.01); *C04B 35/565* (2013.01); *C04B 35/581* (2013.01); *C04B 35/584* (2013.01); *C04B 35/597* (2013.01); *C04B 35/6264* (2013.01); *C04B 35/632* (2013.01); *C08K 5/09* (2013.01); *H01G 4/12* (2013.01); *C04B 2235/3236* (2013.01); *C04B 2235/5445* (2013.01); *C04B 2237/346* (2013.01)

(58) Field of Classification Search
CPC .. C04B 35/632; C04B 35/053; C04B 35/111; C04B 35/18; C04B 35/453; C04B 35/46; C04B 35/4682; C04B 35/486; C04B 35/565; C04B 35/581; C04B 35/584; C04B 35/597; H01G 4/12; H01G 4/1209; C08K 5/09; B32B 18/00
See application file for complete search history.

(56) References Cited

U.S. PATENT DOCUMENTS

2007/0262496 A1 * 11/2007 Frank et al. .................. 264/603

FOREIGN PATENT DOCUMENTS

| JP | 63-79752 | 4/1988 |
|---|---|---|
| JP | 2001-089245 | 4/2001 |
| JP | 2001089245 A * | 4/2001 |
| JP | 2006-089354 | 4/2006 |
| JP | 2006-282490 | 10/2006 |
| JP | 2008-133371 | 6/2008 |
| WO | 2011-092963 | 8/2011 |
| WO | 2011-102197 | 8/2011 |

OTHER PUBLICATIONS

International Search Report issued Jan. 15, 2013 in PCT/JP12/075012 filed Sep. 28, 2012.

* cited by examiner

*Primary Examiner* — Alexa Neckel
*Assistant Examiner* — Marie Reddick
(74) *Attorney, Agent, or Firm* — Oblon, McClelland, Maier & Neustadt, L.L.P

(57) ABSTRACT

A slurry composition including a polyvinyl acetal resin and an organic solvent. The polyvinyl acetal resin has a degree of polymerization of 500 or more and 6000 or less, has a vinyl ester unit content of 0.01 to 30 mol %, has a degree of acetalization of 50 to 83 mol %, includes the structural unit represented by chemical formula (1):

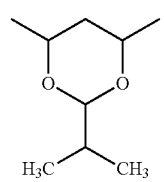

(1)

in an amount of no less than 30 mol % relative to the total molar amount of all acetalized structural units in a molecule, and includes 10 to 1000 ppm of 2-methyl propanoic acid relative to the polyvinyl acetal resin.

12 Claims, No Drawings

SLURRY COMPOSITION, CERAMIC GREEN SHEET, AND MULTI LAYER CERAMIC CAPACITOR

CROSS REFERENCE TO RELATED APPLICATIONS

The present application is a 35 U.S.C. §371 national stage patent application of International patent application PCT/JP2012/075012, filed on Sep. 28, 2012, published as WO/2013/047717 on Apr. 4, 2013, the text of which is incorporated by reference, and claims the benefit of the filing date of Japanese application no. 2011-211940, filed on Sep. 28, 2011, the text of which is also incorporated by reference.

TECHNICAL FIELD

The present invention relates to a slurry composition containing a polyvinyl acetal resin, a ceramic green sheet and a multi layer ceramic capacitor.

BACKGROUND ART

When a multi layer ceramic capacitor is produced, the following steps are generally adopted. First, a binder resin such as a polyvinyl butyral resin and a plasticizer are added to an organic solvent in which ceramic powders are dispersed and the obtained mixture is homogeneously mixed with a ball mill and the like to prepare a slurry composition for ceramic green sheets. The prepared slurry composition is formed by casting on a strippable support such as a polyethylene terephthalate film, and a solvent and the like are distilled away by heating and the like, followed by stripping from the support to produce a ceramic green sheet.

Next, a plurality of sheets in which a conductive paste, which acts as an internal electrode, is applied on the surface of the ceramic green sheet by screen printing or the like are alternately layered, and a layered product is obtained by thermal compression bonding. Further, a layered product is formed by several steps and cut into a fixed shape. A treatment to remove a binder component and the like contained in this layered product by pyrolysis, what is called degreasing treatment, is carried out, and then by undergoing a step of sintering external electrodes on the end faces of a ceramic fired object obtained by firing, a multi layer ceramic capacitor is produced. Therefore, working properties for excellent preparation operation and strength which can resist several steps are required for the above slurry composition and the above ceramic green sheet, respectively.

In recent years, an increase in capacity and miniaturization of a multi layer ceramic capacitor are desired along with the multi-functionalization and miniaturization of electronic device. In response to this, as ceramic powders used for ceramic green sheets, those with a fine particle diameter of 0.5 $\mu$M or less are used, and an attempt to apply them on a strippable support in a thin film state with, for example, 5 $\mu$m or less is made.

When ceramic powders with a fine particle diameter are used, however, packing density and surface areas increase. Thus, the amount of binder resin used increases, and along with this, the viscosity of a slurry composition for ceramic green sheets also increases. Therefore, application has become difficult and the poor dispersion of ceramic powders themselves has occurred. On the other hand, in several steps when making a ceramic green sheet, stress such as tension and bending is loaded, and thus a binder resin with a high degree of polymerization is used in order to be able to tolerate such stress.

Patent Literature 1 discloses that a ceramic green sheet obtained from a slurry composition for ceramic green sheets has excellent mechanical strength, wherein the slurry composition for ceramic green sheets contains a polyvinyl acetal resin with a degree of polymerization of more than 2400 and 4500 or less, an amount of vinyl ester unit of 1 to 20 mol % and a degree of acetalization of 55 to 80 mol %, ceramic powders and an organic solvent.

Nowadays, however, further thinning of a ceramic green sheet is desired, and in a case in which a super-thin layer ceramic green sheet is made using the above ceramic slurry composition, when the thickness thereof is 2 $\mu$m or less, there has been a problem in that a sheet attack phenomenon easily occurs.

Herein, the sheet attack phenomenon is a phenomenon in which, when a conductive paste, which acts as an internal electrode layer, is printed on the obtained ceramic green sheet, a binder resin contained in the ceramic green sheet is dissolved by an organic solvent in the conductive paste, and defects such as cracks occur on the ceramic green sheet. By the occurrence of this sheet attack phenomenon, the electrical performance and reliability of a multi layer ceramic capacitor deteriorate and the yield ratio significantly decreases.

Patent Literature 2 discloses a polyvinyl acetal resin obtained by acetalization of a polyvinyl alcohol resin with a degree of saponification of 80 mol % or more and a number-average degree of polymerization of 1000 to 4000, wherein the polyvinyl acetal resin composition is characterized in that the degree of acetalization is 60 to 75 mol %, and the ratio of a portion acetalized by acetaldehyde and a portion acetalized by butylaldehyde (the number of moles of hydroxy groups disappeared by acetalization by butylaldehyde/the number of moles of hydroxy groups disappeared by acetalization by acetaldehyde) is 0.1 to 2.

There is, however, a limit on the miniaturization of a multi layer ceramic capacitor, and for an increase in capacity of a chip or miniaturization of a chip with the capacity maintained, not only thinning of a green sheet but also multilayering thereof is desired. Along with such multilayering and miniaturization, there is a problem of hygroscopic properties during storage of green sheets. That is, a binder resin absorbs moisture during storage and thus dimensional change occurs, and thin films are laminated into a multilayer and thus when there is a large amount of water per layer, moisture is quickly evaporated during degreasing and ply separation, called delamination, occurs. Therefore, humidity control during storage of green sheets and the control of degreasing conditions are very important.

Polyvinyl acetal acetalized by acetaldehyde, for example, has a high glass transition temperature and sufficient mechanical strength. Acetaldehyde, however, has low hydrophobicity, and thus a mixed acetalized compound with butylaldehyde exemplified also has high hygroscopic properties and has not satisfied the above problem. In addition, in an acetalized compound by butylaldehyde, low hygroscopic properties have not been sufficiently satisfied.

As described above, Patent Literature 1 and Patent Literature 2 do not disclose a polyvinyl acetal resin having properties which have little dimensional change during storage of green sheets and are less prone to cause ply separation during degreasing.

CITATION LIST

Patent Literature

Patent Literature 1: JP 2006-089354 A
Patent Literature 2: JP 2008-133371 A

SUMMARY OF INVENTION

Technical Problem

In view of the above circumstance, an object of the present invention is to provide a slurry composition, by which a ceramic green sheet to be obtained has sufficient mechanical strength and has little dimensional change during storage and ply separation is less prone to occur at the beginning of degreasing.

Solution to Problem

As a result of an intensive investigation, the present inventors found that a polyvinyl acetal resin, which had a degree of polymerization of 500 or more and 6000 or less, a vinyl ester unit content of 0.01 to 30 mol % and a degree of acetalization of 50 to 83 mol % and was acetalized with an aldehyde including 2-methylpropanal, had a high glass transition temperature and showed low hygroscopic properties, thereby completing the present invention.

The present invention relates to a slurry composition, including a polyvinyl acetal resin which has a degree of polymerization of 500 or more and 6000 or less, a vinyl ester unit content of 0.01 to 30 mol %, a degree of acetalization of 50 to 83 mol % and a structural unit represented by chemical formula (1):
in an amount of 30% or more relative to a total molar amount of all acetalized structural units in a molecule, 10 to 1000 ppm of 2-methyl propanoic acid relative to the polyvinyl acetal resin and an organic solvent.

[Chem. 1]

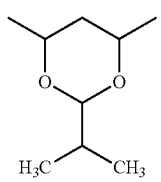

(1)

It is preferable that the polyvinyl acetal resin further has a structural unit represented by chemical formula (2) and/or a structural unit represented by chemical formula (3) in the molecule.

[Chem. 2]

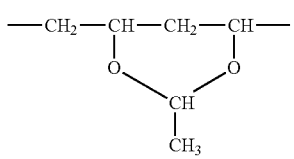

(2)

[Chem. 3]

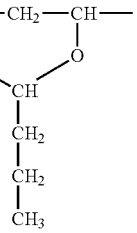

(3)

The slurry composition according to the present invention preferably further includes ceramic powders.

Further, the present invention relates to a ceramic green sheet obtained by using the slurry composition.

Further, the present invention relates to a multi layer ceramic capacitor obtained by using the ceramic green sheet.

Advantageous Effects of Invention

According to the slurry composition of the present invention, a ceramic green sheet which has sufficient mechanical strength and has little dimensional change during storage is obtained. In addition, according to such ceramic green sheet, a multi layer ceramic capacitor in which ply separation is less prone to occur at the beginning of degreasing is obtained.

DESCRIPTION OF EMBODIMENTS

The present invention will be now described in detail.

The polyvinyl acetal resin used in the present invention has a degree of polymerization of 500 or more and 6000 or less. In a case in which the degree of polymerization is less than 500, when a ceramic green sheet is made, mechanical strength becomes insufficient. In a case in which the degree of polymerization is more than 6000, because the polyvinyl acetal resin is not sufficiently dissolved in an organic solvent or the solution viscosity becomes too high, the coating properties and dispersion properties deteriorate. The preferred lower limit is 1000 and the preferred upper limit is 4500. Further preferably, the lower limit is 1500 and the upper limit is 3500.

The above polyvinyl acetal resin can be produced by acetalization of a polyvinyl alcohol resin with a degree of polymerization of 500 or more and 6000 or less using an aldehyde.

It is noted that the above degree of polymerization is calculated from both the viscosity-average degree of polymerization of a polyvinyl alcohol resin used for producing a polyvinyl acetal resin, and the viscosity-average degree of polymerization of the polyvinyl acetal resin. That is, because the degree of polymerization is not changed by acetalization, the degree of polymerization of a polyvinyl alcohol resin is the same as of a polyvinyl acetal resin obtained by acetalization of the polyvinyl alcohol. The viscosity-average degree of polymerization of a polyvinyl alcohol resin means the average degree of polymerization calculated based on JIS K6726, but is not particularly limited thereto. In addition, when two or more polyvinyl alcohol resins are mixed and used as a polyvinyl alcohol resin, the viscosity-average degree of polymerization means the apparent viscosity-average degree of polymerization of the whole polyvinyl alcohol resin after mixing. On the other hand, the degree of polymerization of a polyvinyl acetal resin means the viscosity-average degree of polymerization measured based on a method described in JIS K6728. Herein, when a polyvinyl acetal resin is a mixture of two or more polyvinyl acetal resins, the degree of polymerization means the apparent viscosity-average degree of polymerization of the whole polyvinyl acetal resin after mixing.

The lower limit of the vinyl ester unit content of the above polyvinyl acetal resin is 0.01 mol % and the upper limit is 30 mol %. When the vinyl ester unit content is less than 0.01 mol %, the intramolecular and intermolecular hydrogen bonds of hydroxy groups in a polyvinyl acetal resin increase and thus the viscosity of a slurry composition for ceramic green sheets becomes too high. In addition, the solubility into an organic solvent used for a conductive paste becomes too high and thus the sheet attack phenomenon easily occurs. When the vinyl ester unit content is more than 30 mol %, the glass transition temperature of a polyvinyl acetal resin declines and flexibility becomes too strong, and thus the handling properties, mechanical strength and dimensional stability during thermal compression bonding of ceramic green sheets become worse. The preferred lower limit is 0.5 mol % and the preferred upper limit is 23 mol %, and the further preferred upper limit is 20 mol %. It is noted that a polyvinyl acetal resin with a vinyl ester unit content of 0.01 to 30 mol % is obtained by acetalization of a polyvinyl alcohol resin with a vinyl ester unit content of 0.01 to 30 mol %, i.e. a polyvinyl alcohol resin with a degree of saponification of 70 to 99.99 mol %. The preferred lower limit of the degree of saponification of a polyvinyl alcohol resin is 77 mol %, and the further preferred lower limit is 80 mol % and the preferred upper limit is 99.5 mol %.

The lower limit of the degree of acetalization of the above polyvinyl acetal resin is 50 mol % and the upper limit is 83 mol %. When the degree of acetalization of a polyvinyl acetal resin is less than 50 mol %, the hydrophilicity of the polyvinyl acetal resin is high and the polyvinyl acetal resin is slightly soluble in an organic solvent, and further, in a ceramic green sheet, dimensional change occurs by absorbing water during storage, which causes ply separation at the beginning of degreasing. When the degree of acetalization of a polyvinyl acetal resin is more than 83 mol %, remaining hydroxy groups decrease and the toughness of the polyvinyl acetal resin is lost, and also industrial acquisition is difficult in terms of productivity and reactivity, which cause a decline in productivity. The preferred lower limit is 55 mol % and the more preferred lower limit is 60 mol %, and the preferred upper limit is 80 mol %.

In order to adjust the degree of acetalization of the above polyvinyl acetal resin to 50 to 83 mol %, it is required to properly adjust the amount of an aldehyde added to a polyvinyl alcohol resin, and reaction time after addition of the aldehyde and an acid catalyst, and the like. In addition, it is preferred to add 20 to 150 parts by mass of an aldehyde to 100 parts by mass of a polyvinyl alcohol.

The degree of acetalization of a polyvinyl acetal resin can be calculated by measuring $^1$H-NMR spectrum after the polyvinyl acetal resin is dissolved in DMSO-d6 (dimethyl sulfoxide).

The polyvinyl acetal resin used in the present invention has the structural unit represented by the chemical formula (1) in an amount of 30% or more relative to the total molar amount of all acetalized structural units in a molecule.

[Chem. 4]

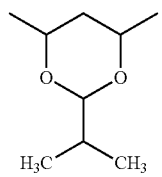

(1)

The structural unit represented by the above chemical formula (1) is a structure in which the isopropyl group is further bound to the carbon atom to which two oxygen atoms are bound. Thus, a polyvinyl acetal resin having not less than a specified amount of this structural unit has the excellent balance of physical properties and also has excellent heat and moisture resisting properties when producing a coated film. On the other hand, when the percentage of the structural unit represented by the above chemical formula (1) to all acetalized structural units in a polyvinyl acetal resin is less than 30%, hygroscopic properties become high, which causes dimensional change in a green sheet and delamination during degreasing. The percentage of the structural unit represented by the above chemical formula (1) is preferably 40% or more and further preferably 50% or more. The upper limit of the percentage is not particularly limited, and may be 100%, that is, all acetalized structural units may be the structural unit represented by the above chemical formula (1). The above polyvinyl acetal resin can be produced by acetalization of a polyvinyl alcohol resin using an aldehyde including 2-methylpropanal.

It is preferred that the polyvinyl acetal resin used in the present invention further have the structural unit represented by the chemical formula (2) and/or the structural unit represented by the chemical formula (3) in the molecule.

[Chem. 5]

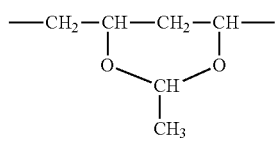

(2)

[Chem. 6]

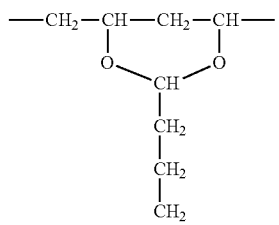

(3)

When a polyvinyl acetal resin to be obtained has the structural unit represented by the chemical formula (2), the mechanical strength thereof is improved. In addition, when a polyvinyl acetal resin to be obtained has the structural unit represented by the chemical formula (3), low hygroscopic properties thereof are improved. The percentage of the structural unit(s) represented by the above chemical formula (2) and/or chemical formula (3) is normally 70% or less, preferably 60% or less and further preferably 50% or less. The lower limit of the percentage is not particularly limited and is preferably 10% or more. The above polyvinyl acetal resin can be produced by addition of a polyvinyl alcohol resin to 2-methylpropanal and further acetalization using an aldehyde including acetaldehyde and/or n-butylaldehyde.

The glass transition temperature of the polyvinyl acetal resin used in the present invention is preferably 72 to 100° C. and more preferably 75 to 95° C. When the glass transition temperature is less than 72° C., mechanical strength is lowered, and when the glass transition temperature is more than 100° C., thermal compression bonding properties become worse, which tends to cause delamination.

The polyvinyl acetal resin used in the present invention is normally produced using a polyvinyl alcohol resin as an ingredient. The above polyvinyl alcohol resin can be obtained by a conventionally known means, i.e., by polymerizing a vinyl ester monomer and saponifying the obtained polymer. As a method for polymerizing a vinyl ester monomer, a conventionally known method can be applied, such as a solution polymerization method, a bulk polymerization method, a suspension polymerization method or an emulsion polymerization method. As a polymerization initiator, an azo initiator, a peroxide initiator, a redox initiator or the like is properly selected depending on a polymerization method. For a saponification reaction, alcoholysis, hydrolysis and the like using a conventionally known alkali catalyst or acid catalyst can be applied, and among these, a saponification reaction using methanol as a solvent and a caustic soda (NaOH) catalyst is easy and most preferred.

Examples of vinyl ester monomers include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, vinyl benzoate and the like, and particularly preferred is vinyl acetate.

In addition, when polymerized, the above vinyl ester monomer may be copolymerized with another monomer without departing from the spirit of the present invention. Therefore, the polyvinyl alcohol resin in the present invention is a concept also including a polymer constituted from a vinyl alcohol unit and another monomer unit. Examples of other monomers include, for example, α-olefins such as ethylene, propylene, n-butene and i-butene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide derivatives such as acrylamide, N-methylacrylamide, N-ethylacrylamide, N,N-dimethylacrylamide, diacetone acrylamide, acrylamide-propanesulfonic acid and salts thereof, acrylamide propyl dimethylamine and acid salts or quaternary salts thereof, N-methylolacrylamide and derivatives thereof; methacrylamide derivatives such as methacrylamide, N-methylmethacrylamide, N-ethylmethacrylamide, methacrylamide-propanesulfonic acid and salts thereof, methacrylamide propyl dimethylamine and acid salts or quaternary salts thereof, N-methylolmethacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; maleic acid and salts, esters or anhydrides thereof; vinylsilyl compounds such as vinyltrimethoxysilane; isopropenyl acetate and the like. These monomers are normally used in the proportion of less than 10 mol % to vinyl ester monomers.

When another monomer unit is an α-olefin unit, the preferred lower unit of the content thereof is 1 mol % and the preferred upper limit is 20 mol %. When the α-olefin unit content is less than 1 mol %, the effect by containing the above α-olefin is insufficient. When the α-olefin unit content is more than 20 mol %, hydrophobicity becomes too strong and thus the dispersion properties of ceramic powders deteriorate, and the solubility of a polyvinyl alcohol resin deteriorates and thus an acetalization reaction becomes difficult.

The acid catalyst used for acetalization is not particularly limited and any of organic acids and inorganic acids can be used. Examples thereof include acetic acid, para-toluenesulfonic acid, nitric acid, sulfuric acid, hydrochloric acid and the like. Among these, hydrochloric acid, sulfuric acid and nitric acid are preferably used, and hydrochloric acid and nitric acid are particularly preferably used.

The polyvinyl acetal resin used in the present invention can be obtained by a method as described below. First, an aqueous solution of a polyvinyl alcohol resin with a concentration of 3 to 15 mass % is prepared in a temperature region of 80 to 100° C. and then gradually cooled over 10 to 60 minutes. When the temperature declines to −10 to 40° C., an aldehyde and an acid catalyst are added thereto and an acetalization reaction is carried out for 10 to 300 minutes with the temperature maintained constant. After that, it is preferred that a maturation step of heating the reaction solution to a temperature of 15 to 80° C. over 30 to 200 minutes and maintaining the temperature for 0 to 360 minutes be included. Next, the reaction solution is suitably cooled to room temperature, and after washing with water, a neutralizing agent such as an alkali is added thereto, followed by washing and drying to obtain a target polyvinyl acetal resin.

In the present invention, by using 2-methylpropanal as an aldehyde used for acetalization of a polyvinyl alcohol resin, the structural unit represented by the chemical formula (1) can be introduced into a polyvinyl acetal resin. The following aldehydes, however, may be used without losing the characteristics of the present invention. Examples thereof include aliphatic aldehydes such as formaldehyde (including paraformaldehyde), acetaldehyde, propionaldehyde, valeraldehyde, isovaleraldehyde, hexyl aldehyde, 2-ethylbutylaldehyde, pivalaldehyde, octyl aldehyde, 2-ethylhexylaldehyde, nonyl aldehyde, decyl aldehyde and dodecyl aldehyde, and alkyl acetals thereof; alicyclic aldehydes such as cyclopentane aldehyde, methyl cyclopentane aldehyde, dimethyl cyclopentane aldehyde, cyclohexane aldehyde, methyl cyclohexane aldehyde, dimethyl cyclohexane aldehyde and cyclohexane acetaldehyde, and alkyl acetals thereof; unsaturated cyclic aldehydes such as cyclopentene aldehyde and cyclohexene aldehyde, and alkyl acetals thereof; aromatic or unsaturated bond-containing aldehydes such as benzaldehyde, methylbenzaldehyde, dimethylbenzaldehyde, methoxybenzaldehyde, phenylacetaldehyde, phenylpropyl aldehyde, cuminaldehyde, naphthyl aldehyde, anthraldehyde, cinnamaldehyde, crotonaldehyde, acrolein and 7-octen-1-al, and alkyl acetals thereof; heterocyclic aldehydes such as furfural and methylfurfuralaldehyde, and alkyl acetals thereof; and the like.

In addition, the aldehydes which can be used for acetalization of a polyvinyl alcohol resin in the present invention and have a hydroxy group, a carboxylic acid group, a sulfonic acid group or a phosphoric acid group or the like as a functional group include hydroxy group-containing aldehydes such as hydroxyacetaldehyde, hydroxypropionaldehyde, hydroxybutylaldehyde, hydroxypentylaldehyde, salicylaldehyde and dihydroxybenzaldehyde, and alkyl acetals thereof; acid-containing aldehydes; such as glyoxylic acid and metal salts or ammonium salts thereof, 2-formylacetic acid and metal salts or ammonium salts thereof, 3-formylpropionic acid and metal salts or ammonium salts thereof, 5-formylpentanoic acid and metal salts or ammonium salts thereof, (4-formylphenoxy)acetic acid and metal salts or ammonium salts thereof, 2-carboxybenzaldehyde and metal salts or ammonium salts thereof, 4-carboxybenzaldehyde and metal salts or ammonium salts thereof, 2,4-dicarboxybenzaldehyde and metal salts or ammonium salts thereof; benzaldehyde-2-sulfonic acid and metal salts or ammonium salts thereof, benzaldehyde-2,4-disulfonic acid and metal salts or ammonium salts thereof, 4-formylphenoxysulfonic acid and metal salts or ammonium salts thereof, 3-formyl-1-propanesulfonic acid and metal salts or ammonium salts thereof, 7-formyl-1-heptanesulfonic acid and metal salts or ammonium salts thereof; 4-formylphenoxyphosphonic acid and metal salts or ammonium salts thereof; and alkyl acetals thereof; and the like.

Furthermore, the aldehydes which can be used for acetalization of a polyvinyl alcohol resin and have an amino group, a cyano group, a nitro group or a quaternary ammonium salt or the like as a functional group include aminoacetaldehyde, dimethylaminoacetaldehyde, diethylaminoacetaldehyde, aminopropionaldehyde, dimethylaminopropionaldehyde, aminobutylaldehyde, aminopentyl aldehyde, aminobenzaldehyde, dimethylaminobenzaldehyde, ethylmethylaminobenzaldehyde, diethylaminobenzaldehyde, (pyrrolidyl)acetaldehyde, (piperidyl) acetaldehyde, (pyridyl)acetaldehyde, cyanoacetaldehyde, α-cyanopropionaldehyde, nitrobenzaldehyde, trimethyl-p-formylphenylammonium iodine, triethyl-p-formylphenylammonium iodine and trimethyl-2-formylethylammonium iodine, and alkyl acetals thereof, and the like.

The aldehydes which can be used for acetalization of a polyvinyl alcohol resin and have a halogen as a functional group include chloroacetaldehyde, bromoacetaldehyde, fluoroacetaldehyde, chloropropionaldehyde, bromopropionaldehyde, fluoropropionaldehyde, chlorobutylaldehyde, bromobutylaldehyde, fluorobutylaldehyde, chloropentyl aldehyde, bromopentyl aldehyde, fluoropentyl aldehyde, chlorobenzaldehyde, dichlorobenzaldehyde, trichlorobenzaldehyde, bromobenzaldehyde, dibromobenzaldehyde, tribromobenzaldehyde, fluorobenzaldehyde, difluorobenzaldehyde, trifluorobenzaldehyde, trichloromethylbenzaldehyde, tribromomethylbenzaldehyde, trifluoromethylbenzaldehyde, and alkyl acetals thereof, and the like. Among these, when an acetalization reaction is carried out using aldehydes other than 2-methylpropanal in combination, as described above, acetaldehyde and/or n-butylaldehyde are preferably used.

An aldehyde used for producing the above polyvinyl acetal resin is preferably a monoaldehyde (one aldehyde group in a molecule). When acetalization is carried out by a compound having two or more aldehyde groups, because of differences in stress relaxation force between a cross-linking site and an uncross-linking site, warping can occur when producing a film. Therefore, it is preferred that an aldehyde to be used be only a monoaldehyde, and it is preferred that even when a compound having two or more aldehyde groups is used, acetalization be carried out by adding the compound in an amount of less than 0.005 mol % and more preferably an amount of 0.003 mol % or less relative to the vinyl alcohol unit of a polyvinyl alcohol resin.

The polyvinyl acetal resin used in the present invention contains 10 to 1000 ppm of 2-methyl propanoic acid. When a little amount of 2-methyl propanoic acid is contained, the dispersion properties of ceramic powders are improved. A polyvinyl acetal resin with a 2-methyl propanoic acid content of less than 10 ppm is not preferred because washing conditions during production are severe, as well as delamination between a ceramic layer and a conductive layer of a fired body to be obtained can occur. On the other hand, a 2-methyl propanoic acid content of more than 1000 ppm is not preferred because there are tendencies that the strength of a green sheet to be obtained from the slurry of the present invention deteriorates and delamination of a fired body occurs.

The slurry composition of the present invention contains an organic solvent along with the above polyvinyl acetal resin. The organic solvent is not particularly limited, and examples thereof include ketones such as acetone, methyl ethyl ketone, dipropyl ketone and diisobutyl ketone; alcohols such as methanol, ethanol, isopropanol and butanol; aromatic hydrocarbons such as toluene and xylene; esters such as methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate and 2-ethylhexyl butyrate; glycols or terpenes such as methyl cellosolve, ethyl cellosolve, butyl cellosolve, α-terpineol, butyl cellosolve acetate and butyl carbitol acetate. These organic solvents may be used alone or two or more organic solvents may be used in combination. The upper limit of the organic solvent content relative to the total amount of the slurry composition of the present invention is 80 mass % and preferably 70 mass % and the lower limit is 20 mass %. With the above range, proper mixing properties can be provided to the slurry composition of the present invention. When the organic solvent content is more than 80 mass %, the viscosity becomes too low, and thus handling properties when forming a sheet become worse. When the organic solvent content is less than 20 mass %, the viscosity of a slurry composition becomes too high, and thus there is a tendency that mixing properties deteriorate.

When, in particular, a slurry composition, which contains the above slurry composition and further ceramic powders, is dissolved in a 1:1 mixed solvent of ethanol and toluene, which is generally used, in a step of producing a ceramic green sheet, because a polyvinyl acetal resin providing proper solution viscosity is contained, a ceramic green sheet which shows sufficient coating properties and mechanical strength and has excellent filling properties can be obtained using such slurry composition as an ingredient.

The above ceramic powders are not particularly limited, and examples thereof include powders of alumina, zirconia, aluminum silicate, titanium oxide, zinc oxide, barium titanate, magnesia, sialon, spinel mullite, silicon carbide, silicon nitride, aluminum nitride and the like. These ceramic powders may be used alone, or two or more ceramic powders may be used in combination. The upper limit of the ceramic powder content relative to the total amount of the above slurry composition containing ceramic powders is 80 mass % and the lower limit is 30 mass %. When the ceramic powder content is less than 30 mass %, viscosity becomes too low, and thus handling properties when forming a ceramic green sheet become worse. When the ceramic powder content is more than 80 mass %, the viscosity of a slurry composition becomes too high, and thus there is a tendency that mixing properties deteriorate.

The above slurry composition containing ceramic powders may contain an acrylic resin and a cellulose resin as binder resins along with the above polyvinyl acetal resin. In this case, the preferred lower limit of the content of the above polyvinyl acetal resin accounting for the whole binder resin is 30 mass %. When the polyvinyl acetal resin content is less than 30 mass %, the mechanical strength and thermal compression bonding properties of a ceramic green sheet to be obtained can be insufficient.

To the above slurry composition containing ceramic powders, a plasticizer can be added as needed. Types of plasticizer to be added are not particularly limited, and examples thereof include phthalate plasticizers such as dioctyl phthalate, benzyl butyl phthalate, dibutyl phthalate, dihexyl phthalate, di(2-ethylbutyl) phthalate and di(2-ethylhexyl) phthalate (DOP); adipate plasticizers such as dihexyl adipate and di(2-ethylhexyl) adipate (DOA); glycol plasticizers such as ethylene glycol, diethylene glycol and triethylene glycol; glycol ester plasticizers such as triethylene glycol dibutyrate, triethylene glycol di(2-ethyl butyrate) and triethylene glycol di(2-ethyl hexanoate); and the like. Two or more of these can be used in combination. Among these, DOP, DOA and triethylene glycol 2-ethyl hexanoate are suitable because volatility is low and the flexibility of a sheet is easily maintained. The amount of plasticizer used is not particularly limited, and a plasticizer is preferably used in an amount of 0.1 to 10 mass % relative to the total amount of a slurry composition, and more suitably 1 to 8 mass %.

The above slurry composition containing ceramic powders may contain conventionally known additives such as a lubricant, a dispersing agent, an antistatic agent and an antioxidant along with the above binder resin and plasticizer without losing the effect of the present invention.

The method for producing the above slurry composition containing ceramic powders is not particularly limited, and examples thereof include a method in which the above binder resin containing a polyvinyl acetal resin, ceramic powders, an organic solvent and a variety of additives to be added as needed are mixed using a variety of blenders such as a ball mill, a blender mill and a three-roll mill.

By the above slurry composition containing ceramic powders, a thin film ceramic green sheet having sufficient mechanical strength can be produced. The method for producing a ceramic green sheet is not particularly limited, and the ceramic green sheet can be produced by a conventionally known production method. Examples thereof include a method in which the above slurry composition containing ceramic powders is formed by casting on a strippable support such as a polyethylene terephthalate film, a solvent and the like are distilled off by heating and the like, followed by stripping from the support, and the like.

A multi layer ceramic capacitor can be made by applying a conductive paste on the above ceramic green sheets and laminating the sheets. As described above, a multi layer ceramic capacitor obtained by using the ceramic green sheet of the present invention and the conductive paste is also one of the present invention.

The method for producing the multi layer ceramic capacitor of the present invention is not particularly limited, and the multi layer ceramic capacitor can be produced by a conventionally known production method. Examples thereof include a method in which a plurality of sheets in which a conductive paste, which acts as an internal electrode, is applied on the surface of the ceramic green sheet of the present invention by screen printing and the like are alternately layered, a layered product is obtained by thermal compression bonding, a binder component and the like contained in this layered product are removed by thermal decomposition (degreasing treatment), and then external electrodes are sintered to the end faces of a ceramic fired object obtained by firing, and the like.

EXAMPLES

The present invention will now be described in more detail by way of examples. The present invention is, however, not limited to the examples. It is noted that in the following examples, "%" and "parts" mean "mass %" and "parts by mass" unless otherwise specified.

Several physical properties of a polyvinyl acetal resin were measured according to the following methods.
(The Vinyl Acetate Unit Content, the Vinyl Alcohol Unit Content and the Degree of Acetalization in a Polyvinyl Acetal Resin)
They were calculated by $^1$H-NMR.
(Glass Transition Temperature)
Using EXTAR6000 (RD220) manufactured by Seiko Instruments Inc. as DSC (differential scanning calorimeter), a polyvinyl acetal resin is heated from 30° C. to 150° C. at a temperature increase rate of 10° C./min in nitrogen, and then cooled to 30° C., and again heated to 150° C. at a temperature increase rate of 10° C./min. The measured value after second heating was applied as glass transition temperature.
(Percentage of Water Absorption)
A sample for measurement with a thickness of 0.2 mm and a size of 10 cm×10 cm was dried under reduced pressure at 50° C. for 6 days, and mass when the sample after drying was immersed in pure water at 20° C. for 24 hours was then measured and the percentage of water absorption was calculated according to the following formula.

Percentage of water absorption (mass %)=[(mass after immersion−mass after drying before immersion)/ (mass after drying before immersion)]×100

(The 2-Methyl Propanoic Acid Content in a Polyvinyl Acetal Resin)
The 2-methyl propanoic acid content in a polyvinyl acetal resin was determined by thermal desorption GC/MS under the following conditions.
Thermal Desorption Conditions
Desorption temperature: 100° C.
Desorption time: 10 min.
Trap temperature: −30° C.
Desorption temperature: 260° C.
Desorption retention time: 30 min.
(GC Conditions)
Oven temperature: a temperature increase from 40° C. to 240° C.
Carrier gas: He, 1.0 mL/min.
Sample amount: 50 mg (a freeze-crushed product)

Example 1

Preparation of a Polyvinyl Acetal Resin

In a glass container with an internal volume of 2 liter, equipped with a reflux condenser, a thermometer and an anchor-shaped stirring blade, 1295 g of ion exchanged water and 105 g of polyvinyl alcohol (PVA-1: the degree of polymerization 1700 and the degree of saponification 98.8 mol %) were put, and the whole was heated to 95° C. to totally dissolve the polyvinyl alcohol, and an aqueous solution of the polyvinyl alcohol (concentration 7.5 mass %) was obtained. While continuously stirring the obtained aqueous solution of the polyvinyl alcohol at a rotation speed of 120 rpm, the aqueous solution was gradually cooled to 13° C. over approximately 30 minutes and 60.0 g of 2-methylpropanal was then added to such aqueous solution, and 100 ml of hydrochloric acid with a concentration of 20 mass %, which is an acetalization catalyst, was further added thereto to initiate the acetalization of the polyvinyl alcohol. Acetalization was carried out for 15 minutes and the reaction system was then heated to 47° C. over 120 minutes and maintained at 47° C. for 180 minutes, and then cooled to room temperature. The resins precipitated by cooling were separated by filtration and washed ten times with ion exchanged water with 100-fold the amount of a resin. After that, for neutralization, a 0.3 mass % solution of sodium hydroxide was added thereto and the obtained mixture was maintained at 50° C. for 5 hours. Rewashing was further repeated ten times with a 100-fold amount of ion exchanged water, and after dehydration, drying was carried out under reduced pressure at 40° C. for 18 hours to obtain a polyvinyl acetal resin (PVIB-1). When the obtained polyvinyl acetal resin (PVIB-1) was analyzed, the content of the structural unit acetalized by 2-methylpropanal (the degree of acetalization) was 70.9 mol %, the vinyl acetate unit content was 1.2 mol %, and the vinyl alcohol unit content was 27.9 mol %. To a mixed solvent of 20 parts by mass of toluene and 20 parts by mass of ethanol, 10 parts by mass of the obtained polyvinyl acetal resin were added, and 8 parts by mass of DOP were further added thereto as a plasticizer and dissolved by stirring. To the obtained resin solution, 100 parts by mass of barium titanate (manufactured by Sakai Chemical Industry Co., Ltd., BT-03 (average particle diameter 0.3 μm)) were added as ceramic powders, and the obtained mixture was mixed with a ball mill for 48 hours to obtain a slurry composition for ceramic green sheets.

Example 2

A polyvinyl acetal resin (PVIB-2) was obtained in the same manner as in Example 1 except that PVA-2 (the degree of polymerization 800 and the degree of saponification 98.4 mol %) was used in place of PVA-1 and 61.5 g of 2-methylpropanal was used. The degree of acetalization was 71.7 mol %, the vinyl acetate unit content was 1.6 mol %, and the vinyl alcohol unit content was 26.7 mol %. Next, a slurry composition for ceramic green sheets was obtained using PVIB-2 in the same manner as in Example 1.

Example 3

A polyvinyl acetal resin (PVIB-3) was obtained in the same manner as in Example 1 except that PVA-3 (the degree of polymerization 2400 and the degree of saponification 98.8 mol %) was used in place of PVA-1 and 59.6 g of 2-methylpropanal was used. The degree of acetalization was 70.3 mol %, the vinyl acetate unit content was 1.2 mol %, and the vinyl alcohol unit content was 28.5 mol %. Next, a slurry composition for ceramic green sheets was obtained using PVIB-3 in the same manner as in Example 1.

Example 4

A polyvinyl acetal resin (PVIB-4) was obtained in the same manner as in Example 1 except that PVA-4 (the degree of polymerization 4000 and the degree of saponification 98.9 mol %) was used in place of PVA-1 and 65.1 g of 2-methylpropanal was used. The degree of acetalization was 75.6 mol %, the vinyl acetate unit content was 1.1 mol %, and the vinyl alcohol unit content was 23.3 mol %. Next, a slurry composition for ceramic green sheets was obtained using PVIB-4 in the same manner as in Example 1.

Example 5

A polyvinyl acetal resin (PVIB-5) was obtained in the same manner as in Example 1 except that PVA-5 (the degree of polymerization 1700 and the degree of saponification 88.0 mol %) was used in place of PVA-1 and 50.6 g of 2-methylpropanal was used. The degree of acetalization was 71.2 mol %, the vinyl acetate unit content was 12.0 mol %, and the vinyl alcohol unit content was 16.8 mol %. Next, a slurry composition for ceramic green sheets was obtained using PVIB-5 in the same manner as in Example 1.

Example 6

A polyvinyl acetal resin (PVIB-6) was obtained in the same manner as in Example 1 except that 35.5 g of 2-methylpropanal and 30.5 g of n-butylaldehyde were used as aldehydes. The content of the structural unit acetalized by 2-methylpropanal was 41.8 mol %, the content of the structural unit acetalized by n-butylaldehyde was 35.1 mol %, the vinyl acetate unit content was 1.2 mol %, and the vinyl alcohol unit content was 21.9 mol %. Next, a slurry composition for ceramic green sheets was obtained using PVIB-6 in the same manner as in Example 1.

Example 7

A polyvinyl acetal resin (PVIB-7) was obtained in the same manner as in Example 1 except that 30.5 g of 2-methylpropanal and 20.4 g of acetaldehyde were used as aldehydes. The content of the structural unit acetalized by 2-methylpropanal was 41.6 mol %, the content of the structural unit acetalized by acetaldehyde was 37.6 mol %, the vinyl acetate unit content was 1.2 mol %, and the vinyl alcohol unit content was 19.6 mol %. Next, a slurry composition for ceramic green sheets was obtained using PVIB-7 in the same manner as in Example 1.

Comparative Example 1

A polyvinyl acetal resin (PVB-A) was obtained in the same manner as in Example 1 except that 58.4 g of n-butylaldehyde was used as an aldehyde in place of 2-methylpropanal. The degree of acetalization was 68.6 mol %, the vinyl acetate unit content was 1.2 mol %, and the vinyl alcohol unit content was 30.2 mol %. Next, a slurry composition for ceramic green sheets was obtained using PVB-A in the same manner as in Example 1.

Comparative Example 2

A polyvinyl acetal resin (PVB-B) was obtained in the same manner as in Example 2 except that 60.5 g of n-butylaldehyde was used as an aldehyde in place of 2-methylpropanal. The degree of acetalization was 71.2 mol %, the vinyl acetate unit content was 1.6 mol %, and the vinyl alcohol unit content was 27.2 mol %. Next, a slurry composition for ceramic green sheets was obtained using PVB-B in the same manner as in Example 1.

Comparative Example 3

A polyvinyl acetal resin (PVB-C) was obtained in the same manner as in Example 3 except that 58.7 g of n-butylaldehyde was used as an aldehyde in place of 2-methylpropanal. The degree of acetalization was 68.7 mol %, the vinyl acetate unit content was 1.2 mol %, and the vinyl alcohol unit content was 30.1 mol %. Next, a slurry composition for ceramic green sheets was obtained using PVB-C in the same manner as in Example 1.

Comparative Example 4

A polyvinyl acetal resin (PVB-D) was obtained in the same manner as in Example 1 except that 35.8 g of n-butylaldehyde and 19.5 g of acetaldehyde were used as aldehydes in place of 2-methylpropanal. The content of the structural unit acetalized by n-butylaldehyde was 40.0 mol %, the content of the structural unit acetalized by acetaldehyde was 36.9 mol %, the vinyl acetate unit content was 1.2 mol %, and the vinyl alcohol unit content was 21.9 mol %. Next, a slurry composition for ceramic green sheets was obtained using PVB-D in the same manner as in Example 1.

Comparative Example 5

A polyvinyl acetal resin (PVB-E) was obtained in the same manner as in Example 1 except that 18.5 g of 2-methylpropanal and 47.8 g of n-butylaldehyde were used as aldehydes. The content of the structural unit acetalized by 2-methylpropanal was 21.6 mol %, the content of the structural unit acetalized by n-butylaldehyde was 55.3 mol %, the vinyl acetate unit content was 1.2 mol %, and the vinyl alcohol unit content was 21.9 mol %. Next, a slurry composition for ceramic green sheets was obtained using PVB-E in the same manner as in Example 1.

Comparative Example 6

A polyvinyl acetal resin (PVB-F) was obtained in the same manner as in Example 1 except that 20.2 g of 2-methylpropanal and 29.5 g of acetaldehyde were used as aldehydes. The content of the structural unit acetalized by 2-methylpropanal was 23.0 mol %, the content of the structural unit acetalized by acetaldehyde was 56.2 mol %, the vinyl acetate unit content was 1.2 mol %, and the vinyl alcohol unit content was 19.6 mol %. Next, a slurry composition for ceramic green sheets was obtained using PVB-F in the same manner as in Example 1.

Comparative Example 7

A polyvinyl acetal resin (PVB-G) was obtained in the same manner as in Example 1 except that 41.2 g of 2-methylpropanal was used. The degree of acetalization was 48.3 mol %, the vinyl acetate unit content was 1.2 mol %, and the vinyl alcohol unit content was 50.5 mol %. Next, a slurry composition for ceramic green sheets was obtained using PVB-G in the same manner as in Example 1.

Comparative Example 8

A polyvinyl acetal resin (PVB-H) was obtained in the same manner as in Example 1 except that PVA-6 (the degree of polymerization 400 and the degree of saponification 98.8 mol %) was used in place of PVA-1 and 60.3 g of 2-methylpropanal was used. The degree of acetalization was 70.8 mol %, the vinyl acetate unit content was 1.2 mol %, and the vinyl alcohol unit content was 28.0 mol %. Next, a slurry composition for ceramic green sheets was obtained using PVB-H in the same manner as in Example 1.

Comparative Example 9

A slurry composition for ceramic green sheets was obtained in the same manner as in Example 1 except that rewashing of PVIB-1 obtained in Example 1 with ion exchanged water was repeated another 40 times.

Comparative Example 10

A slurry composition for ceramic green sheets was obtained in the same manner as in Example 1 except that rewashing of PVIB-1 obtained in Example 1 with ion exchanged water was carried out once.
(Production of a Ceramic Green Sheet)
The slurry compositions for ceramic green sheets obtained in Examples 1 to 7 and Comparative Examples 1 to 10 were applied on a polyester film subjected to releasing treatment using a bar coater so that a dry thickness would be 1 μm, and air-drying is carried out at normal temperature for an hour, followed by drying at 80° C. for 3 hours by a hot-air dryer and then drying at 120° C. for 2 hours to obtain a ceramic green sheet.
(Evaluation)
(Evaluation of Mechanical Strength)
The obtained ceramic green sheet was stripped from the polyester film, and a state of the ceramic green sheet was observed and evaluated using the following three levels. The results are shown in Table 1.
◯: Tears and cracks were not observed in a ceramic green sheet,
Δ: tears and cracks were slightly observed, and
x: tears and cracks were clearly observed.
(Evaluation of Dimensional Stability During Storage)
A ceramic green sheet with 30 cm×30 cm was left in a hot and humid layer at 23° C. and 65% RH, and the rates of dimensional change after film production and at 10 days therefrom were measured and evaluated using the following two levels. The results are shown in Table 1.
◯: The rate of dimensional change in a ceramic green sheet is less than 0.1% and warping is not observed, and
x: the rate of dimensional change in a ceramic green sheet is 0.1% or more or warping is observed.
(Production of a Conductive Paste)
As conductive powders, 100 parts by mass of nickel powders (2020SS, manufactured by MITSUI MINING 86 SMELTING CO., LTD.), and 5 parts by mass of ethyl cellulose (manufactured by The Dow Chemical Company STD-100), and 60 parts by mass of Terpineol C (manufactured by Nippon Terpene Chemicals, Inc.) as a solvent were mixed, and the obtained mixture was then mixed with a three roller to obtain a conductive paste.
(Production of a Ceramic Fired Body)
The conductive paste obtained above was applied on the one side of the ceramic green sheet obtained above by a screen printing method so that a thickness after drying would be approximately 1.0 μm, and dried to form a conductive layer. The ceramic green sheet having this conductive layer was cut into a 5 cm square and 100 pieces of the sheet were layered and thermocompression bonded at a temperature of 70° C. at a pressure of 150 kg/cm² for 10 minutes to obtain a layered product. The obtained layered product was heated to 400° C. under an atmosphere of nitrogen at a temperature increase rate of 3° C./min and maintained for 5 hours, and further heated to 1350° C. at a temperature increase rate of 5° C./min and maintained for 10 hours to obtain a ceramic fired body.
(Evaluation of Delamination of a Fired Body)
This fired body was cooled to normal temperature and then cut into half, and observed with an electron microscope. The existence of delamination between a ceramic layer and a conductive layer was observed and evaluated using the following three levels. The results are shown in Table 1.
◯: Delamination is not observed,
Δ: delamination is slightly observed, and
x: delamination is observed.

TABLE 1

| | | | Polyvinyl acetal | | | | | | | | Green sheet | | Fired body |
|---|---|---|---|---|---|---|---|---|---|---|---|---|---|
| | Signs | Aldehydes | Degree of polymerization | Vinyl alcohol unit [mol %] | Vinyl acetate unit [mol %] | Degree of acetalization [mol %] | Glass transition temperature [° C.] | Percentage of water absorption [%] | 2-Methyl-propanoic acid | Mechanical strength | Dimensional change during storage | Existence of delamination |
| Example 1 | PVIB-1 | 2-methylpropanal | 1700 | 27.9 | 1.2 | 70.9 | 84 | 4.6 | 20 | ○ | ○ | ○ |
| Example 2 | PVIB-2 | 2-methylpropanal | 800 | 26.7 | 1.6 | 71.7 | 81 | 4.2 | 30 | ○ | ○ | ○ |
| Example 3 | PVIB-3 | 2-methylpropanal | 2400 | 28.5 | 1.2 | 70.3 | 82 | 4.3 | 30 | ○ | ○ | ○ |
| Example 4 | PVIB-4 | 2-methylpropanal | 4000 | 23.3 | 1.1 | 75.6 | 91 | 3.8 | 100 | ○ | ○ | Δ |
| Example 5 | PVIB-5 | 2-methylpropanal | 1700 | 16.8 | 12.0 | 71.2 | 77 | 3.2 | 20 | ○ | ○ | ○ |
| Example 6 | PVIB-6 | 2-methylpropanal butylaldehyde | 1700 | 21.9 | 1.2 | 41.8 35.1 | 75 | 2.8 | 20 | ○ | ○ | ○ |
| Example 7 | PVIB-7 | 2-methylpropanal acetaldehyde | 1700 | 19.6 | 1.2 | 41.6 37.6 | 97 | 4.6 | 20 | ○ | ○ | ○ |
| Comparative Example 1 | PVB-A | butylaldehyde | 1700 | 30.2 | 1.2 | 68.6 | 73 | 7.5 | <1 | X | X | X |
| Comparative Example 2 | PVB-B | butylaldehyde | 800 | 27.2 | 1.6 | 71.2 | 70 | 7.1 | <1 | X | X | X |
| Comparative Example 3 | PVB-C | butylaldehyde | 2400 | 30.1 | 1.2 | 68.7 | 74 | 7.4 | <1 | Δ | X | X |
| Comparative Example 4 | PVB-D | butylaldehyde acetaldehyde | 1700 | 21.9 | 1.2 | 40.0 36.9 | 89 | 8.7 | <1 | X | X | X |
| Comparative Example 5 | PVB-E | 2-methylpropanal butylaldehyde | 1700 | 21.9 | 1.2 | 21.6 55.3 | 70 | 4.3 | 5 | X | ○ | X |
| Comparative Example 6 | PVB-F | 2-methylpropanal acetaldehyde | 1700 | 19.6 | 1.2 | 23.0 56.2 | 102 | 10.9 | 5 | Δ | X | X |
| Comparative Example 7 | PVB-G | 2-methylpropanal | 1700 | 50.5 | 1.2 | 48.3 | 93 | 9.8 | 20 | ○ | X | Δ |
| Comparative Example 8 | PVB-H | 2-methylpropanal | 400 | 28.0 | 1.2 | 70.8 | 79 | 4.7 | 30 | X | ○ | ○ |
| Comparative Example 9 | PVIB-1 | 2-methylpropanal | 1700 | 27.9 | 1.2 | 70.9 | 84 | 4.5 | 5 | ○ | ○ | Δ |
| Comparative Example 10 | PVIB-1 | 2-methylpropanal | 1700 | 27.9 | 1.2 | 70.9 | 84 | 4.8 | 1200 | X | ○ | Δ |

INDUSTRIAL APPLICABILITY

According to the slurry composition of the present invention, a ceramic green sheet which has sufficient mechanical strength and has little dimensional change during storage is obtained. In addition, by such ceramic green sheet, a multi layer ceramic capacitor in which ply separation is less prone to occur at the beginning of degreasing is obtained.

The invention claimed is:

1. A slurry composition, comprising:
    a polyvinyl acetal resin; and
    organic solvent,
    wherein the polyvinyl acetal resin has a degree of polymerization of from 1500 to 3500, has a vinyl ester unit content of from 0.01 to 30 mol %, has a degree of acetalization of from 50 to 83 mol %, comprises a structural unit represented by formula (1):

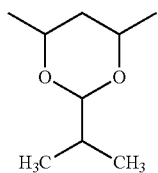

(1)

in an amount of no less than 30 mol % relative to a total molar amount of all acetalized structural units in a molecule, and comprises 10 to 1000 ppm of 2-methyl propanoic acid relative to the polyvinyl acetal resin.

2. The slurry composition according to claim 1, wherein the polyvinyl acetal resin further comprises at least one structural unit represented by formula (2):

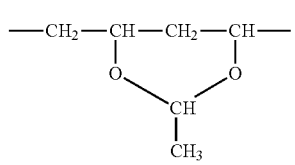

(2)

and formula (3):

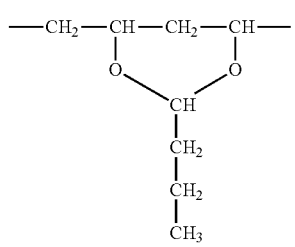

(3)

in the molecule.

3. The slurry composition according to claim 2, wherein the polyvinyl acetal resin comprises the structural unit represented by formula (2).

4. The slurry composition according to claim 2, wherein the polyvinyl acetal resin comprises the structural unit represented by formula (3).

5. The slurry composition according to claim 2, wherein the polyvinyl acetal resin comprises the structural unit represented by formula (2) and the structural unit represented by formula (3).

6. The slurry composition according to claim 1, further comprising a ceramic powder.

7. A ceramic green sheet, obtained by using the slurry composition according to claim 6.

8. A ceramic green sheet, obtained by a process comprising drying the slurry composition according to claim 6.

9. The slurry composition according to claim 1, wherein the polyvinyl acetal resin has the vinyl ester unit content of from 0.5 mol % to 23 mol %.

10. The slurry composition according to claim 1, wherein the polyvinyl acetal resin has the vinyl ester unit content of from 0.5 mol % to 20 mol %.

11. The slurry composition according to claim 1, wherein the polyvinyl acetal resin has the degree of acetalization of from 55 to 80 mol %.

12. The slurry composition according to claim 1, wherein the polyvinyl acetal resin has the degree of acetalization of from 60 to 80 mol %.

\* \* \* \* \*